United States Patent [19]

Walton et al.

[11] Patent Number: 4,918,416

[45] Date of Patent: Apr. 17, 1990

[54] ELECTRONIC PROXIMITY IDENTIFICATION SYSTEM

[75] Inventors: Charles A. Walton, Los Gatos; France Rode, Los Altos, both of Calif.

[73] Assignee: Sielox Systems, Inc., Cupertino, Calif.

[21] Appl. No.: 240,341

[22] Filed: Aug. 26, 1988

Related U.S. Application Data

[63] Continuation of Ser. No. 28,031, Mar. 18, 1987, abandoned, which is a continuation of Ser. No. 669,069, Nov. 7, 1984, abandoned.

[51] Int. Cl.⁴ ............................................. G06K 19/06
[52] U.S. Cl. .................... 235/497; 235/492; 340/825.63
[58] Field of Search ............... 235/492, 493, 439, 449; 343/6.5 SS, 6.8 R, 6.8 LC; 340/353, 825-863

[56] References Cited

U.S. PATENT DOCUMENTS

| | | | |
|---|---|---|---|
| 2,887,674 | 5/1959 | Greene | 340/825.63 X |
| 3,752,960 | 8/1973 | Walton . | |
| 4,196,418 | 4/1980 | Kip et al. . | |
| 4,223,830 | 9/1980 | Walton | 235/380 |
| 4,236,068 | 11/1980 | Walton | 235/380 |
| 4,333,072 | 6/1982 | Beigel | 235/449 X |
| 4,380,762 | 4/1983 | Capasso | 340/825.63 |
| 4,388,524 | 6/1983 | Walton | 235/380 |
| 4,546,241 | 10/1985 | Walton | 343/6.5 SS |

Primary Examiner—David L. Trafton
Attorney, Agent, or Firm—Alfred Stapler

[57] ABSTRACT

An identification system in which power drain is minimized is disclosed. The system comprises a reader (10) including a first signal generator (12) for generating a first signal (F1) which is then radiated by an antenna (17). An identifier (11) is shown which includes an antenna (20) for receiving the first signal for transmission to a signal modulator (32) which operates to modulate the first signal in accordance with a preassigned code for the identifier. The modulated signal is then used to periodically unload or change the reactance of the antenna (20) which action in turn changes the reactance of the reader antenna (17) and the consequent voltage on the reader antenna. By detecting the change in the voltage on the reader antenna the code of the identifier is determined. Power is used efficiently by low frequency oscillation within the signal modulator, by unloading during modulation, and by changing circuit reactance without changing the circuit load.

10 Claims, 4 Drawing Sheets

FIG.2A (34) OSCILLATOR
FIG.2B (35) CELL COUNTER
FIG.2C (38) MEMORY DRIVE
FIG.2D (39) MEMORY OUT
FIG.2E (41) ENCODER OUT
FIG.2F (20) CARD R.F. ENVELOPE
FIG.2G (18) READER R.F. ENVELOPE
FIG.2H (48) READER AUDIO SIGNAL

ELECTRONIC PROXIMITY IDENTIFICATION SYSTEM

This application is a continuation of Application Ser. No. 07/028,021, filed Mar. 18, 1987, and now abandoned, which is a continuation of application Ser. No. 06/669,069, filed Nov. 7, 1984, now abandoned.

FIELD OF THE INVENTION

This invention is an identification system of the type wherein a plurality of portable card type identifiers can be individually distinguished for authorizing financial transactions, for security purposes and similar individual identification.

BACKGROUND OF THE INVENTION

Walton in U.S. Pat. No. 3,752,960 issued Aug. 14, 1973, U.S. Pat. No. 4,223,830 issued Sept. 23, 1980, U.S. Pat. No. 4,236,068 issued Nov. 25, 1980, and U.S. Pat. No. 4,388,524 issued June 14, 1983 and Kip et al. in U.S. Pat. No. 4,196,418 issued Apr. 1, 1980 have disclosed examples of credit card identifiers in which the identification is obtained by placing the card near a reader station. The user need not remove the card from the wallet, handbag, or the like and readinng occurs in a fraction of a second. Each card bears a unique code with the coding typically being entered at the time of manufacture, although in some circumstances field change of the code is possible. In some systems the number of available codes is limited. Typical uses of such identifiers include access control, personal banking and transaction identification, and vehicle and freight car identification.

Such identification systems require the card identifiers to transmit a signal to the reader or otherwise emit an identification code which can be detected by the reader. This signal generation in some cases has been effected by incorporating a battery in the card to power a signal generating circuit. In other instances the identifier derives its power from the interrogating signal and utilizes that power to energize a radio frequency oscillator and signal generator for generating a signal which in turn is radiated back to the reader for identification purposes. It is desirable that the power requirements from the reader to the card be minimal so that (a) the radio frequency radiation from the reader has minimum impact on other users of the radio frequency spectrum and thereby minimizes the possibility of governmental objection to the system, (b) the reader can be maintained compact and inexpensive, and (c) the distance at which the card can be energized and read can be greater.

It is the purpose of the present invention to provide a proximity system with a reader and portable identifier combination which is simple in design, has a large code population, wherein the identifier can readily be powered by the signal from the reader, and in which the power requirements of the card are minimal.

SUMMARY OF THE INVENTION

An identification system is shown comprising a reader including a radio frequency first signal generator for generating a fixed frequency signal which is radiated by an antenna; and an identifier, typically in the form of a credit card, and including an antenna to receive the first signal. The received signal powers the identifier which includes a signal modulator. The signal modulator generates an encoded signal in accordance with a preassigned code recorded in the identifier which encoded signal is used to periodically increase or decrease the reactance of the identifier antenna and cause a reactive change in the circuit of the reader antenna. This change in reactive value is detected, decoded and amplified by the reader to identify the identifier. Power drain is kept low by using a low frequency CMOS data oscillator, by using reactive changes rather than resistive changes, and by using power interruption rather than power loading for encoding.

DESCRIPTION OF THE DRAWINGS

FIGS. 2A through 2H show selected waveforms for the circuits of FIG. 1.

DETAILED DESCRIPTION OF THE INVENTION

Figure 1:
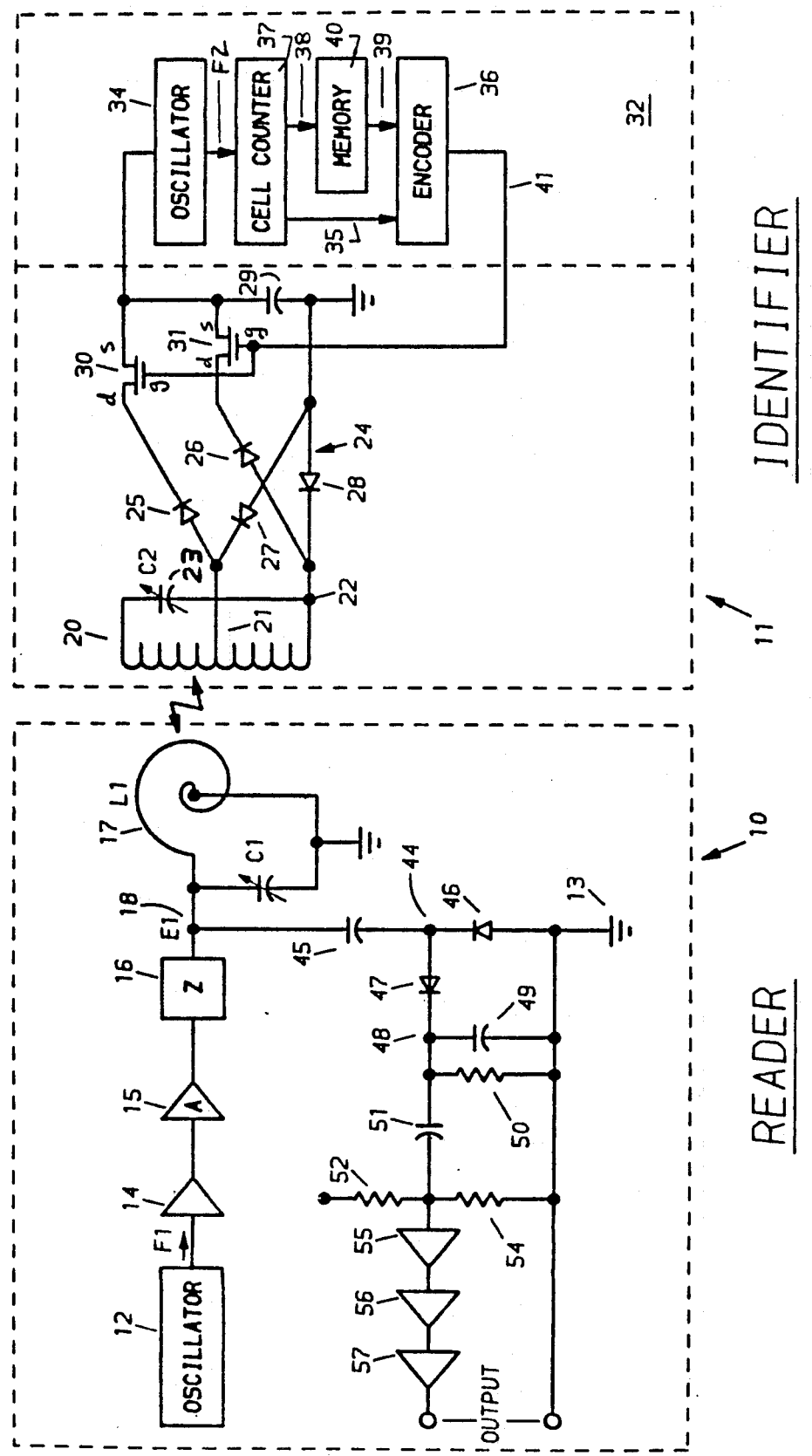
FIG. 1 is a diagram of a preferred embodiment of the reader and identifier.

In FIG. 1 there is shown a preferred embodiment of the invention comprising a reader 10 and a signal identifier 11. Usually the identifier 11 is credit-card size, although it may be larger for such purposes as vehicle and freight car identification, or smaller for placement in a ring or wristwatch. The identifiers 11 need only be held in proximity to the reader 10 for identification. Any number of identifiers 11 can be used singularly with each reader 10.

The reader 10 comprises a first oscillator 12 operating at a frequency F1. Preferably this oscillator operates at one of the industrial, scientific or medical bands, commonly called the ISM bands, with one preferred frequency being 13.56 megahertz. This oscillator 12 drives an isolation amplifier 14, a power amplifier 15 and an impedance 16 to supply a signal E1 to a loop antenna 17 through a node 18. The loop antenna 17 is connected in parallel with a tuning capacitor C1.

The purpose of the oscillator 12 is to supply a first signal F1 suitable for energizing and interrogating any identifier 11 placed close to the antenna 17. The identifier 11 includes a loop antenna 20 which inductively couples the identifier 11 to the reader 10 through the antenna coil 17. The coil 17 acts as a primary of a radio frequency (RF) transformer while the coil 20 acts as a secondary of the same RF transformer.

The loop antennal 20 is tuned at or near the transmitted frequency F1 of the reader 10. The tuning of this antenna 20 is effected by adjustment of the capacitor C2. Between the tap 21 and the end 22 of the antenna is connected a full wave rectifying bridge which converts the AC voltage occurring in the antenna 20 to a DC voltage. The rectifying bridge is formed with the diodes 25-28, and a smoothing capacitor 29 is connected across the output of the bridge. Connected in series with the diodes 25 and 26 are the field-effect transistors (FETs) 30 and 31 controlled by a modulation signal supplied on line 41. When the FETs 30 and 31 are in the conduction mode, normal rectifying action occurs, the coil 20 is loaded, and the capacitor 29 is charged. When the FETs 30 and 31 are nonconductive or off, there is no load on the coil 20 and no rectifying action occurs.

In a quiescent mode, that is, for an unenergized identifier 11 with no voltage on the gates g of the FETs 30 and 31, the FETs 30 and 31 are conductive (if they are depletion mode JFETs), and when the identifier 11 is energized a voltage builds up on the capacitor 29. Alternatively, the FETs 30 and 31 may be of the enhancement mode and not initially conductive, in which case a bypass zener-type diode (not shown) between the drain d and source s nodes of FETs 30 and 31 is used to put an initial charge onto the capacitor 29. The voltage across the capacitor 29 is used to power the logic/memory circuit 32. The purpose of the logic/memory circuit 32 is to provide intelligence and a modulating signal for systematically unloading the coil 20 in accordance with a code recorded in the memory 40 of the identifier 11.

For a binary encoding of the card, the ones and zeroes are distinguished by pulse length modulation. In this instance a longer pulse length is assigned to represent a "1", and a shorter pulse represents a "0". These two pulse lengths are shown in FIGS. 2A–2H, where a bit data cell rate is held constant. When the identifier 11 is energized, an oscillator 34 emits a signal having a frequency F2 which is transmitted to a unit part cell counter 37 which in turn creates a data cell signal having four unit parts. The first unit part is transmitted through the conductor 35 to the encoder 36 and forms the first portion of each bit of modulation. The second and third unit parts are transmitted from the cell counter 37 to the memory 40 via conductor 38 and cause either a 1 or a 0 to be emitted from the memory 40 to the encoder 36 on conductor 39. The encoder 36 acts as an OR gate for the two input signals on lines 35 and 39 to produce a data signal 41. The data signal 41 is one unit part long for a 0 or three unit parts long for a 1. Four unit parts therefore make up a data cell. Thus, the fourth unit part can always remain blank to separate the data cells, and the bit rate of the data is one-fourth of the frequency F2.

FIG. 2A shows the oscillator signal F2 on line 34, FIG. 2B shows the first unit part on line 35, FIG. 2C shows the memory drive parts two and three on line 38, FIG. 2D shows the memory output for a 1 and a 0 on line 39, and FIG. 2E shows the overall output signal of the encoder 36 on line 41. The oscillator 34 runs at or near an audio frequency rate typically between 5 and 50 kHz. The radio frequency (RF) carrier signal coupled through the loop antenna 20 for modulation by the oscillator 34 is the same RF signal which provides power to the logic/memory circuit 32. With CMOS logic, as with other logic families in the logic/memory circuit 32, the lower the frequency F2 of the oscillator 34, the lower will be the power required by the logic/memory circuit 32.

In FIG. 1, the encoder output signal on the conductor 41 is applied to the coil 20 by turning on and off the FETs 30 and 31. For an n-channel junction FET, when the modulation signal 41 is high, the FETs 30 and 31 conduct and normal rectifying action occurs to load the coil 20 and charge the capacitor 29. This is the standby mode. When the modulation signal 41 is low, the FETs 30 and 31 are nonconductive and there is no load on the coil 20 and practically no rectifying action occurs. For a p-channel enhancement mode MOSFET, the gate control voltage is reversed, i.e., a high voltage on line 41 turns the FETs 30 and 31 off. In either case, turning the FETs 30 and 31 off causes the reactance level of coil 20 and capacitor 23 to increase as will be explained later.

When the FETs 30 and 31 are off, the voltage on the capacitor 29 drops to a reduced value. If the voltage on capacitor 29 were to go to zero, the logic/memory circuit 32 would cease to function and the system would fail. However, as the voltage on capacitor 29 falls, the FETs 30 and 31 reach a state where their drain d to source s voltage is within approximately two volts of the gate voltage g on the conductor 41. In this state the two FETs 30 and 31 do not completely turn off and there continues to be a limited but adequate voltage supplied to the logic/memory circuit 32 so that the system continues to perform its necessary functions. Alternatively, to insure that some power always passes to the logic/memory 32, the FETs 30 and 31 can be bypassed between the drain d and source s terminals by a resistor or a zener-type diode. The alternative bypass components are not shown on the drawings.

Returning to FIGS. 2A through 2H, FIG. 2F represents the RF envelope on coil 20. The voltage on coil 20 rises when the coil 20 is unloaded, and the unloading is effected when FETs 30 and 31 are turned off by the modulation signal on line 41. This rise in the coil voltage is due to the increased reactance of the coil 20 and capacitor C2 and in turn causes reactive changes in coil 17.

Figure 3:
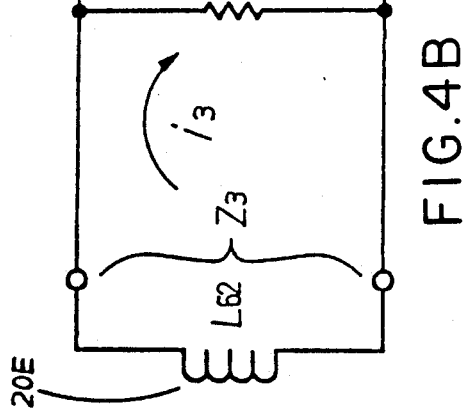
FIG. 3 shows the reactance variation of the reader antenna.

FIG. 3 shows the manner in which the unloading of the coil 20 causes the reactive changes in the coil 17 for detection by the reader 10. The transmitting coil 17 initially is partially tuned by adjusting the capacitor C1 as shown in FIG. 1. If the capacitance of C1 is decreased in value the capacitive reactance X(C) increases and the voltage E1 rises and passes through a peak resonance point P and then falls as shown in FIG. 3. Changes in E1 due to reactance changes occur on both the uphill and downhill sides of the reactance curve of FIG. 3 and either side of the peak P may be used to achieve the desired data communication in the present invention. However, the high-C, low-X uphill side of the reactance curve to the left of the peak P has advantages in the present embodiment and is used in the following explanation.

The reactive condition of the coil 20 and the capacitor C2 reflects capacitive reactance or inductive reactance into the coil 17. Whether this reflection is inductive or capacitive is determined by whichever side of the tuning point P the coil 20 and the capacitor 23 are initially set. If set to couple inductive reactance from antenna 20 into antenna 17, then when modulation action of the unloading type occurs (i.e., FETs 30 and 31 are off), the value of inductive reactance coupled into the circuit of antenna 17 will increase. At the position A on FIG. 3, there is already excess inductive reactance in the circuit, equivalent to insufficient capacitive reactance. The operating point will therefore move to position B during unloading. This reactance change produces a detectable change in voltage E1 at the node 18 of the reader 10 in FIG. 1.

During a normal data transfer operation, the voltage E1 on the node 18 shifts between the values indicated by the point A and B in FIG. 3. This change is maximized by intentionally operating the resonant circuit of the coil 17 and the capacitor C1 on the slope of the resonance curve and not on the peak resonance point P. The output source impedance of the amplifier 15 must be of sufficiently high a value or this change in voltage E1 will be attenuated by this source impedance. To assure this sufficiently high impedance value, an impedance 16 is inserted between the amplifier 15 and the coil 17 to minimize attenuation due to the amplifier 15.

Figure 4A:
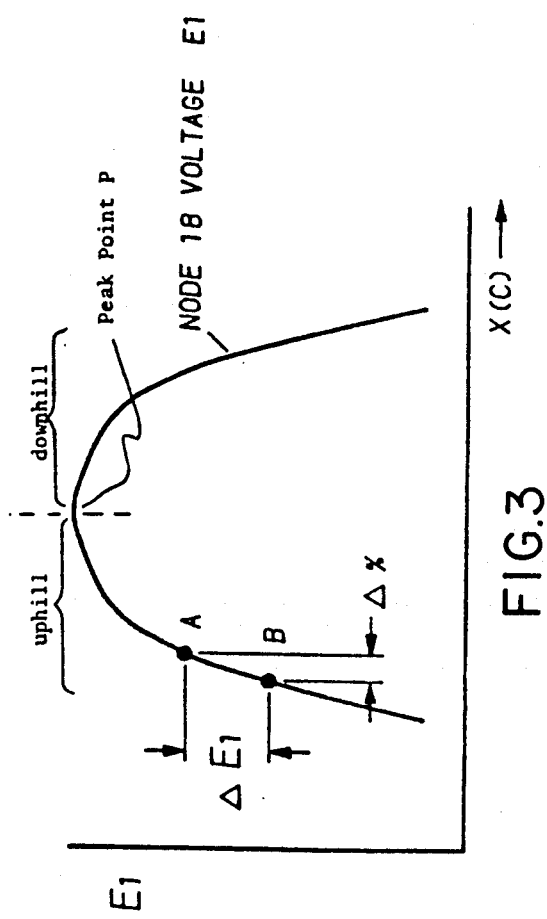
FIGS. 4A and 4B show equivalent circuits of the present system.

The equations which follow and the equivalent circuit as shown in FIG. 4A show the preceding explanation in mathematical terms. The resistors R61, R62, and R63 represent the losses present in the reactive circuit as in FIG. 1. The analysis given is for the input impedance ZXY between points Y and X in which point Y is ground and point X is the point 18 where the signal voltage E1 appears. As ZXY varies due to action in identifier 11, current i1 and voltage E1 will vary.

To find the expression for ZXY, let W equal omega radians per second, j equal the operator $(-1)^{\frac{1}{2}}$, and M equal the mutual inductance between L61 and L62.

$$Z1 = R61 + j(WL61 - 1/WC61)$$
and
$$Z2 = R62 + j(WL62 - 1/WC62);$$
then
$$ZXY = (1/WC61)^2 * (Z2/(Z1Z2 + (WM)^2)) - j/WC61.$$

Figure 4B:
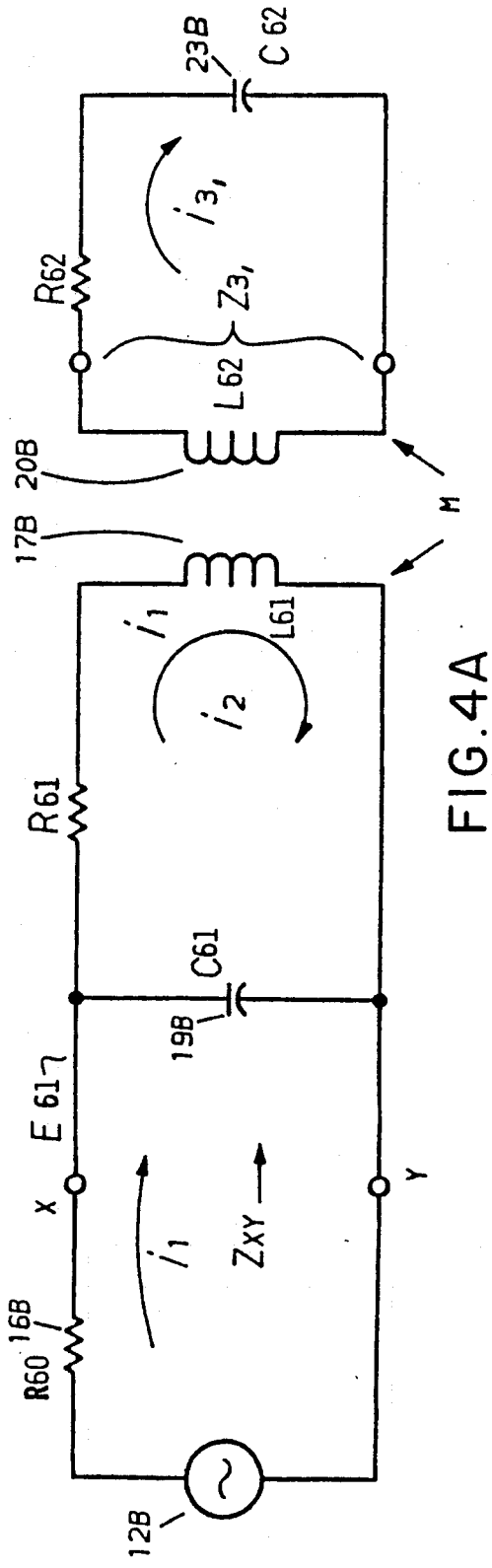

The general conclusions of the preceding equations are: First, if M is small or zero, as when the identifier 11 is some distance away from reader 10, the effect of Z2 drops out of the equations. When the identifier 1 and reader 10 are in close proximity, M is large (i.e., $M=K(L61*L62)^{\frac{1}{2}}$) and the effect of the changes in Z2 are maximum. Second, small values of R61 and R62 increase the Q of the circuit, where Q=WL/R, and increase the sensitivity of the circuit to reactive changes. Third, changing the secondary resistance value R62 changes the reactive and resistive parts of ZXY. This third statement is valid whether R62 represents a series resistance or an equivalent shunt resistance R63 as shown in FIG. 4B. Thus, the data on line 41 from the logic/memory circuit 32 makes its presence known by altering the value of R62 or the parallel equivalent value R63.

The overall circuit impedance of the identifier 11 is Z2, and is formed of the inductance L62 and of capacitance and resistance which form an impedance Z3. If the identifier resistance and capacitance are in series, they are labeled R62 and C62 as in FIG. 4A. If the identifier resistance and capacitance are in parallel, they are labeled R63 and C63 as shown in FIG. 4B. The equivalent circuit of the identifier 11 as shown in FIG. 4B looks the same to the reader 10 as does the equivalent circuit of the identifier 11 as shown in FIG. 4A. Thus, $$Z2 = R62 + j(WL62 - 1/WC62),$$
and
$$Z2 = jWL62 + R62 - j/WC62,$$
or
$$Z2 = jWL62 + Z3.$$
$$Z3 = R62 - j/WC62,$$
also
$$Z3 = R63/(1/jWC63),$$
and
$$Z3 = R63(1/jWC63)/(R63 + (1/jWC63)).$$

The values for R63 and C63 in terms of R62 and C62 are:

$$R63 = (1 + (WR62C62)^2)/(W^2 * C62^2 * R62)$$
and
$$C63 = C62/(1 + (WR62C62)^2).$$

The inverse equations giving the values of R62 and C62 in terms of R63 and C63 are:

$$R62 = R63/(1 + (WR63C63)^2)$$
and
$$C62 = (1 + WR63C63)/(W^2 * (R63)^2 * C63).$$

For a typical Q value of 100, the series resistance R62 will be a few tenths of an ohm, and the equivalent parallel resistance R63 will be above 1000 ohms. Modulation in the identifier 11 is achieved by varying the value of R63 with FETs 30 and 31, and the voltage E1 is modulated by the identifier 11.

Returning to the circuit in FIG. 1, the voltage E1 as shown in FIG. 2G is passed through a capacitor 45 to eliminate its direct current component, with diodes 46 and 47 peak detecting the remaining AC component of E1. The RF component of the signal E1 is shunted to ground by the capacitor 49. A resistor 50 permits a steady leakage current to flow so that the rectifying action of diodes 46 and 47 can follow the waveform envelope at node 48 as shown in FIG. 2H. The waveform at node 48 is an audio frequency or data frequency signal representing the logic signal 41 generated by the logic/memory circuit 32 of the identifier 11. This data signal 48 is then transmitted through a capacitor 51 and biased by resistors 52 and 54 to be amplified by the cascaded amplifiers 55-57. The amplifier 57 is selected to limit or "square off" the data signal 48 thereby forming logic signals while retaining the time transitions and the width of the signals which bear the information indicating the 1s and 0s of the code stored in the memory 40. Thus, the code of the identifier 11 is delivered at the output terminals of the reader 10.

Figure 5:
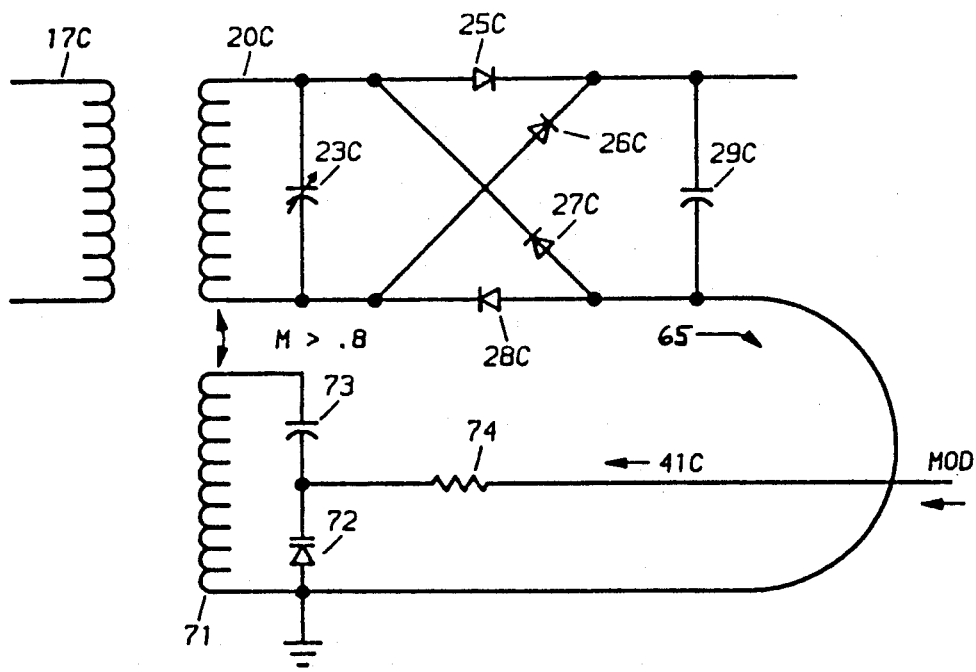
FIG. 5 shows a high Q variable capacitor method of modulation.

In FIG. 5 there is a modulation technique which neither interrupts nor loads the source of power, but rather changes the phase angle of a resonant coil 20C of the identifier 11. Changing the phase angle of the resonant coil 20C is equivalent to changing the reactance of the identifier 11, and in the extreme case, the reactance can change from inductive to capacitive reactance. The effect on the primary coil 17C is the same as previously described, and is the same as shown in FIG. 3 with the same analytical relationship as shown in the previous calculations.

In FIG. 5 this change in reactance is achieved by varying the capacitance of a varactor diode 72. The coils 17C and 20C, capacitors 23C and 29C, diodes 25C-28C, and the line 41C all act as did the components of similar identification as shown in FIG. 1. The coil 20C and the diodes 25C-28C provide power for the identifier 11 as before. Closely coupled to and built on the identifier 11 in the same plane and axis as the coil 20C is a coil 71. This shunting coil circuit further includes capacitor 73 and the capacitance of the varactor 72. These two capacitances contribute to the resonant circuit of the identifier 11. The overall resonant circuit includes the coils 20C and 71, which are closely coupled so as to act as a single coil, and the capacitances 23C, 72 and 73. As the line 41C rises and falls with the logic command from the logic/memory circuit 32, the voltage on the varactor 72 also rises and falls. A low voltage on the varactor 72 causes a maximum capacitance that is equivalent to a minimum capacitive reactance. A high voltage on the varactor 72 causes a minimum capacitance and a maximum capacitive reactance. The varactor 72 provides a high quality, high Q form of capacitance.

The total capacitance across the coil 71 falls and rises with the change in voltage on the varactor 72, and the capcitive reactance across the coil 71 correspondingly rises and falls just as the phase angle of the circulating current within the coil 71 varies. The change in phase of the circulating current within coil 71 is mutually coupled and added vectorially to the phase angle of the voltage and the current in the coil 17C. The voltage on the coil 17C then rises and falls as shown in FIG. 3. A resistor 74 allows the slow rise time command voltage 41C of several microseconds duration to pass to the varactor 72, but prevents the RF signal (usually over 10 MHz) present in the coil circuit from being shunted by the logic/memory circuit 32. The rise and fall of the voltage on the coil 17C is detected and amplified as explained earlier for the coil 17 in FIG. 1.

The advantage of using the varactor circuit as shown in FIG. 5 is that for either the high or low value of the varactor reactance, power can flow continuously from coil 17C to coil 20C through the diode rectifiers 25C-28C to the capacitor 29C so that maximum energy is always available to power the logic in the logic/memory circuit 32. Other circuits cause some loss of power through either loading or through current interruption. Furthermore, for producing capacitance variations in RF circuits, the varactor 72 is preferred because of its very high Q at RF frequencies. In addition, through the use of the varactor 72, it is possible to select the values of reactance and the natural frequency where the inductive and capacitive reactances are equal, so that as the varactor 72 causes changes from the value A to the value B as shown in FIG. 3, the identifier 11 moves toward the identifier curcuit's natural frequency. Hence, the varactor 72 produces more voltage for the logic/memory circuit 32 while the sensor antenna 17C delivers less voltage as it moves from point A to point B, thus maintaining a relatively level supply voltage to the logic/memory circuit 32.

Figure 6:
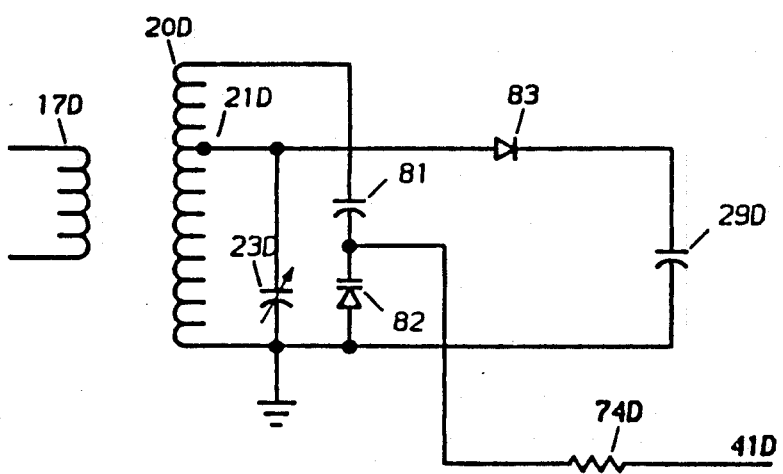
FIG. 6 shows a simplified high Q variable capacitor method of modulation.

A further variation and simplification of the varactor modulator is shown in FIG. 6. In this embodiment, rather than using a full wave diode bridge and two coils as shown in FIG. 5, there is a single coil 20D acting as an auto transformer at radio frequencies with one side of coil 20D at the identifier's ground. A single diode 83 then provides power rectification to a capacitor 29D. The principal part of the resonant capacitance is provided by the capacitor 23D connected at a transformer tap 21D, and the remaining portion of the resonant capacitance is provided by a capacitor 81 and a varactor 82. The varactor capacitance is varied by changing the voltage on line 41D from the logic/memory circuit 32 through resistor 74D as explained for the circuit in FIG. 5. The circuit in FIG. 6 continues to have the advantages of the circuit in FIG. 5, namely, that of allowing power to flow at all times from the reader 10 to the logic/memory circuit 32 in the identifier card 11.

Thus, the power requirements of the identifier 11 are kept low to meet the needs of maximum range and minimum radiation. First, the internal card oscillator 34 is run at a low bit rate and data flows over a single channel without the need of a seperate clock channel. A low clock rate F2, particularly for CMOS logic, draw low currents. Second, the power supply within the identifier 11 is interrupted and the load is diminished during modulation, rather than having the load increase during modulation. Diminishing the load achieves modulation effects yet does not cause energy loss in the identifier 11, and retains power for functioning of the identifier 11. Third, for the capacitive reactance variation with the varactor modulation circuits of the present invention, power is available without interruption even though modulation action is occurring, thereby providing optimum power availability for the logic/memory circuit 32.

What is claimed is:

1. An identification system comprising:
    a reader having
        a first signal generator for generating a first signal, and
        a first antenna connected to said first signal generator for radiating said first signal;
    an identifier having
        a second antenna mutually coupled to said first antenna for receiving radiated power from said first antenna and for sending signals to said first antenna,
        a data-generating circuit powered by said radiated power for generating data in binary form having a selected series of first and second logic states and including transitions in logic level at the beginning and end of a short period for representing the first logic state and transitions in logic level at the beginning and end of a longer period for representing the second logic state, and
        a modulation circuit connected to said data generating circuit for modulating the electrical parameter of said second antenna with said data and through said mutual coupling thereby affect an electrical parameter of said first antenna; and
    a detecting circuit coupled to said reader for detecting changes in said electrical parameter of said first antenna to identify said identifier by detecting said data.

2. An identification system as in claim 1 wherein said modulation of an electrical parameter of said second antenna comprises a change in the phase angle of electrical signals in the second antenna that effects a change in an electrical parameter in the first antenna which is detected as said data by said detecting circuit.

3. An identification system as in claim 2 wherein said change in an electrical parameter of the second antenna effects a change in reactance of said first antenna, and thereby effects a change in voltage across said first antenna which is detected as said data by said detecting circuit.

4. An identification system as in claim 3 wherein said modulation circuit for changing an electrical parameter in the second antenna comprises interrupting means for interrupting the flow of power from said second antenna to said data generating circuit.

5. An identification system as in claim 3 wherein said modulation circuit for changing an electrical parameter in the second antenna comprises control means for changing the phase angle of electrical signals in said second antenna.

6. An identification system as in claim 5 wherein said control means comprises a variable capacitor responsive to said data.

7. An identification system as in claim 6 wherein said variable capacitor comprises a varactor diode.

8. An identification system as in claim 5 wherein said change in an electrical parameter of said second antenna is selected so that reactance-induced voltage changes across said second antenna are of opposite polarity to said reactance-induced voltage changes in said first antenna for providing a substantially constant voltage to power said data-generating circuit.

9. An identification system as in claim 2 wherein the detecting circuit in the reader detects said data by responding to the phase angle changes produced in the electrical signals in the second antenna coupled to the first antenna.

10. The system of claim 1, wherein all said transitions in logic level are in the same direction.

* * * * *